United States Patent
Kremser

[15] 3,704,870
[45] Dec. 5, 1972

[54] APPARATUS FOR SATURATING AND HARDENING THE STATOR WINDING RODS OF HIGH VOLTAGE ELECTRIC MACHINES

[72] Inventor: Gunter Kremser, Mulheim-Ruhr, Germany

[73] Assignee: Siemens Aktiengesellschaft, Berlin and Munich, Germany

[22] Filed: May 12, 1970

[21] Appl. No.: 36,612

[30] Foreign Application Priority Data

May 23, 1969 Germany..........P 19 26 356.0

[52] U.S. Cl. .....................263/2 R, 263/28, 263/47 R
[51] Int. Cl. .............................F27b 9/24, F27d 3/12
[58] Field of Search..........263/47, 2 R, 28; 266/6 PC

[56] References Cited

UNITED STATES PATENTS 3,350,078   10/1967   Schultz et al. ...........266/6 PC

Primary Examiner—John J. Camby
Attorney—Curt M. Avery, Arthur E. Wilfond, Herbert L. Lerner and Daniel J. Tick

[57] ABSTRACT

Each of a plurality of frames has frame wall portions defining the groove dimensions of a corresponding rigid rod wound with the insulating tape and substantially in its final configuration and additional bending frame wall portions for fixing the curved winding end portions of the rod in the junction between the straight groove portion and such end portions. A corresponding one of the rods is inserted into each of the frames thereby preparing the frames and the rods for a saturating operation. A carrier for a plurality of the rods and their frames are combined into a hardening unit. An additional frame is provided for all the rods in common at each surface at each end of the hardening unit for fixing the winding end portions and rod ends thereby preparing the frames and the rods for a hardening operation.

9 Claims, 3 Drawing Figures

PATENTED DEC 5 1972　　3,704,870

APPARATUS FOR SATURATING AND HARDENING THE STATOR WINDING RODS OF HIGH VOLTAGE ELECTRIC MACHINES

DESCRIPTION OF THE INVENTION

The invention relates to the stator winding rods of high voltage electric machines. More particularly, the invention relates to apparatus for saturating and hardening the stator winding rods of high voltage electric machines.

The invention relates to apparatus and a method for saturating and actual size hardening of windings comprising tape, or the like, containing mica having a low adhesive content. The windings are utilized for insulating the stator winding rods of high voltage electric machines. Each rod has a straight groove portion and declinated winding end portions relative to said straight portion. The rods are more particularly utilized in turbogenerators. A turbogenerator rod, covered with a winding, is inserted into a saturation and hardening frame. The rod is saturated within the saturation and hardening frame and is hardened in a manner which establishes the actual size of the outer dimensions of the completed insulation casing. The process of installing the rods into their saturation and hardening frame is thus effected so that by assembling the frame portions, containing spacers and fillers, around the rods, receiving channels are formed which correspond to the groove dimensions of the stack of stator laminations which are later provided with rods. After the saturation and hardening process, the frame components are disassembled or disconnected by opening the receiving channels, thereby freeing the rods from their frame.

The aforedescribed method is known and disclosed in Germant Pat. application No. P 16 13 441.1. The method disclosed in the German patent application is suitable for insulating winding rods and winding or semiwinding elements. In the method disclosed in the German patent application, the winding elements are inserted into receiving channels of a saturation and hardening frame, with an appropriate interspace. The interspace is smaller than the distance between the winding elements in the stack of stator laminations and constitutes only a portion of the tooth width. The winding elements and the spacers defining the receiving channels and fillers, are then stacked in layer sequence in a frame and fixed. Subsequent to the saturation and hardening process, the frame is removed and the winding elements and the spacers and fillers are again moved in sequence. This method is particularly suitable for the production of high quality insulation comprising continuous tapes containing mica and having a low adhesive content.

There is practically no possibility that the rod insulation will be damaged during the insertion of the rods into, or their removal from, the frame. This is due to the fact that the rods, commencing with the unsaturated condition, and extending to the completely hardened condition, remain in the same saturation and hardening frame. The saturated rods are not required to be inserted into presses. After the completion of the saturation and hardening, the rods may be removed with facility from their frame by disassembly of the saturation and hardening frame.

The aforedescribed frame saturation method may be utilized to the greatest advantage with small and medium sized stator winding rods for turbogenerators. The invention is based upon the consideration that the aforedescribed method requires a very large saturation installation, a large hardening furnace and hoisting equipment for the considerable weights involved, due to the very large saturation installations required for turbogenerators having high outputs.

The principal object of the invention is to provide new and improved apparatus for saturating and hardening the stator winding rods of high voltage electric machines.

An object of the invention is to provide apparatus for saturating and hardening the stator winding rods of turbogenerators, which apparatus overcomes the disadvantages of known similar types of apparatus.

An object of the invention is to provide apparatus for saturating and hardening large stator winding rods of turbogenerators without increasing the dimensions of the saturation installation or of the hardening furnace and without requiring hoisting equipment for the weights involved.

An object of the invention is to provide apparatus and a method for saturating and hardening the stator winding rods of high voltage electric machines with efficiency, effectiveness and reliability.

In accordance with the invention, the stator winding rods for turbogenerators having high outputs are provided in substantially their final configuration and are relatively rigid. The insulation on the stator winding rods is initially unsaturated. In the frame saturating process of the invention, one of the rigid rods, wound with the outer insulation and in substantially its final configuration, is initially placed into one frame. Frame wall portions are provided for defining the groove dimensions of the rod. Additional bending frame wall portions are provided which fix only the curved rod ends. The additional bending frame wall portions are provided in the junction region between the groove and the winding end portion. After the saturation of an individual rod, a plurality of rods and their frame are combined to form a hardening unit. The rods are affixed to their frame in parallel with their axes. The nonfixed winding end portions and rod ends are fixed by an additional frame provided in common for each end of the hardening unit. The hardening unit thereby provided is then subjected to the hardening process.

The advantages of the invention are due primarily to the fact that a sensible combination of known individual rod saturation with multiple rod hardening maintains the output relating to the insulation of large winding rods to a minimum. Furthermore, actual size frame saturation may be provided up to the circuit connecting ends or terminals.

In accordance with the invention, apparatus for saturating and hardening the stator winding rods of high voltage electric machines comprises a baking cart for assembling and transporting the hardening unit. The baking cart has a bottom plate having superstructure components at both ends for additional frames. The frames have bearing surfaces corresponding to the desired curve of the winding end portions. The bearing surfaces are brought into abutment with the bottom surfaces of the rods.

In accordance with the invention, apparatus for saturation and actual size hardening of tapes utilized to insulate rods of stator windings of electric machines, each of the rods having a straight groove portion and curved winding end portions relative to the straight groove portion, comprises a plurality of frames each having frame wall portions defining the groove dimensions of a corresponding rigid rod wound with the insulating tape and substantially in its final configuration, and additional bending frame wall portions for fixing the curved winding end portions of the rod in the junction between the groove and the rod portions, a corresponding one of the rods being inserted into each of the frames thereby preparing the frames and the rods for a saturating operation. A hardening unit means comprises a carrier for a plurality of the rods and their frames combined into a hardening unit with the frames in axial parallel relation to each other and an additional frame provided for all the rods in common at each surface at each end of the hardening unit for fixing the winding end portions and rod ends thereby preparing the frames and the rods for a hardening operation.

The additional frame of the hardening unit means comprises curved bearing surfaces corresponding to the curve of the winding end portions of the rods for supporting the bottom surfaces of the rods.

The carrier may comprise a wheeled vehicle including a bottom plate and structure at each end for the additional frame of the hardening unit means, or a slidable platform including a bottom plate and structure at each end for the additional frame of the hardening unit means.

In accordance with the invention, apparatus for saturating and actual size hardening of tapes containing mica and having a small adhesive content utilized to insulate rods of stator windings of turbogenerators, each of the rods having a straight groove portion and curved winding end portions relative to the straight groove portion, rods wound with the tapes being inserted into a saturating and hardening frame and saturated in the frame and hardened in a manner which determines the outer dimensions of the completed wound insulating tape, the rods being inserted into their frame by assembling of frame portions comprising spacers and fillers in a manner whereby the groove dimensions of a stack of stator laminations for the rods provide appropriate receiving channels, comprises a plurality of frames each having frame wall portions defining the groove dimensions of a corresponding rigid rod wound with the insulating tape and substantially in its final configuration, and additional bending frame wall portions for fixing the curved winding end portions of the rod in the junction between the groove and the end portions, a corresponding one of the rods being inserted into each of the frames thereby preparing the frames and the rods for a saturating operation. A hardening unit means comprises a carrier for a plurality of the rods and their frames combined into a hardening unit with the frames being in axial parallel relation to each other and an additional frame provided for all the rods in common at each surface at each end of the hardening unit for fixing the winding end portions and rod ends thereby preparing the frames and the rods for a hardening operation.

The carrier includes a bottom plate and structure at each end for the additional frame of the hardening unit means.

The additional frame of the hardening unit means comprises curved bearing surfaces corresponding to the curve of the winding end portions of the rods for supporting the bottom surfaces of the rods.

The carrier may comprise a wheeled baking cart or a sled.

In accordance with the invention, a method of saturating and actual size hardening of tapes utilized to insulate rods of stator windings of electric machines, each of the rods having a straight groove portion and curved winding end portions relative to the straight groove portion, comprises saturating the rods by inserting each rigid rod wound with the insulating tape and substantially in its final configuration into one corresponding frame having frame wall portions defining the groove dimensions of the rod and additional bending frame wall portions for fixing the curved winding end portions of the rod in the junction between the groove and the end portions and subjecting the frame and the rods to a saturating operation, hardening a plurality of the rods by combining a plurality of the rods and their frames into a hardening unit by affixing the frames in axial parallel relation to each other and fixing the winding end portions and rod ends with an additional frame provided for all the rods in common at each surface at each end of the hardening unit and subjecting the hardening unit to a hardening operation, and disassembling the frames to free the rods from the frame upon the completion of the saturating and hardening operations.

In accordance with the invention, a method of saturating and actual size hardening of tapes containing mica and having a small adhesive content utilized to insulate rods of stator windings of turbogenerators, each of the rods having a straight groove portion and curved winding end portions relative to the straight groove portion, wherein rods wound with the tapes are inserted into a saturating and hardening frame and saturated in the frame and hardened in a manner which determines the outer dimensions of the completed wound insulating tape, inserting the rods into their frame by assembling of frame portions comprising spacers and fillers in a manner whereby the groove dimensions of a stack of stator laminations for the rods provide appropriate receiving channels, comprises saturating the rods by inserting each rigid rod wound with the insulating tape and substantially in its final configuration into one corresponding frame having frame wall portions defining the groove dimensions of the rod and additional bending frame wall portions for fixing the curved winding end portions of the rod in the junction between the groove and the end portions and subjecting the frames and the rods to a saturating operation, hardening a plurality of the rods by combining a plurality of the rods and their frames into a hardening unit by affixing the frames in axial parallel relation to each other and fixing the winding end portions and rod ends with an additional frame provided for all the rods in common at each surface at each end of the hardening unit, and subjecting the hardening unit to a hardening operation, and disassembling the frames to open the receiving channels and free the rods from the frame upon the completion of the saturating and hardening operations.

In order that the invention may be readily carried into effect, it will now be described with reference to the accompanying drawing, wherein.

Figure 3:
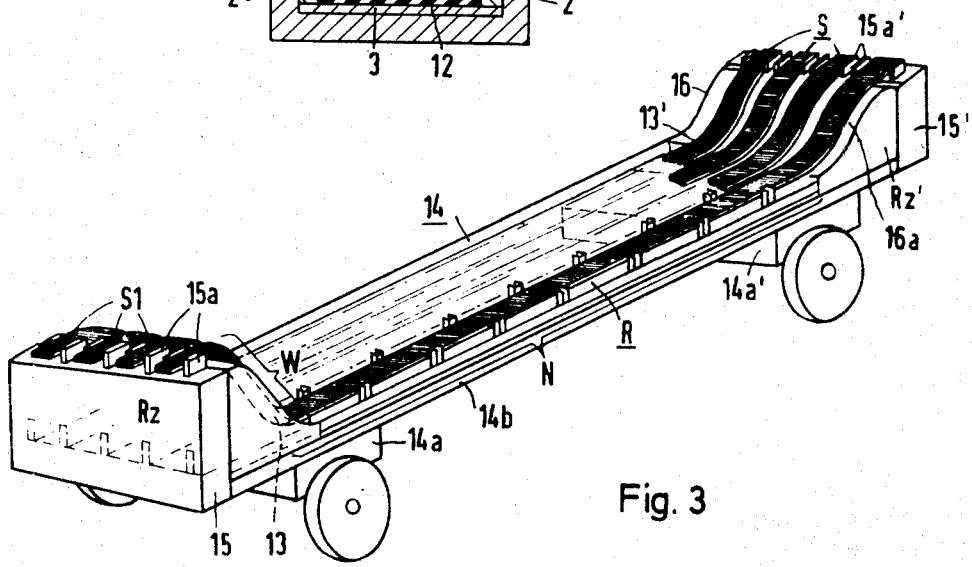
FIG. 3 is a perspective view of an embodiment of the baking cart of the invention having a plurality of clamped rods and additional frames at both ends thereof for final fixing and shaping of the winding end portions of the rods.

In FIG. 3, in order to maintain the clarity of illustration, only the foremost rod is completely shown and only the winding end portions of the remaining rods are shown.

In the figures, the same components are identified by the same reference numerals.

The apparatus of FIGS., 1 2 and 3 functions to provide saturation and actual size hardening of a winding I (FIG. 2) around a stator winding rod S in order to insulate said rod. The winding I preferably comprises tapes or the like containing mica and having low adhesive content. Each of the stator winding rods S has a straight groove portion N (FIG. 3) and winding end portions which are curved relative to said straight groove portion.

The apparatus of the invention is utilized for stator winding rods of high voltage electric machines having high outputs such as, for example, tube generators. When the rods are wound with the unsaturated, hardened continuous insulation I, said rods are in substantially their final configuration and are relatively rigid. In accordance with the invention, the rods S are individually inserted into corresponding hardening frames, one of which, R, is shown in detail in FIGS. 1 and 2.

The frame R utilized in the illustrated embodiment of the invention comprises a pair of frame portions 1 and 1'. The frame portions 1 and 1' are steel profile rods and are welded to a plurality of spacers 1a, 1a', and so on. Each of the spacers 1a, 1a', and so on, together form a basic frame, with said spacers being uniformly spaced or distributed along the length of said frame. The frame R further comprises distance bars 2 and 2' which are insertable into the basic frame 1, 1a, and so on, together with a bottom sheet 3, as fillers and limiting components.

Figure 1:
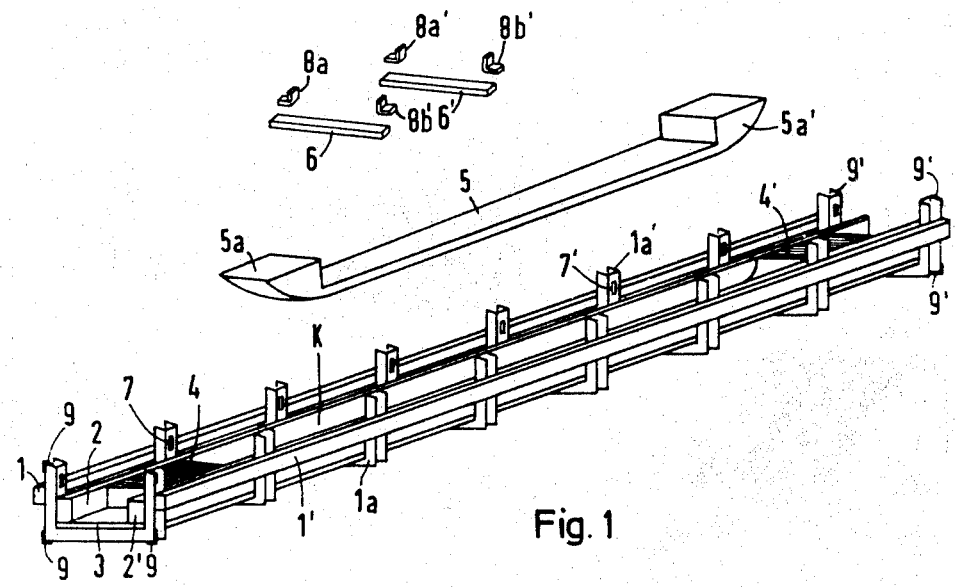
FIG. 1 is a perspective view of the individual parts of the saturation and hardening apparatus of the invention for an individual stator end rod.

The distance bars 2, 2' and the bottom sheet 3 form a receiving channel K (FIG. 1) which corresponds to the groove dimensions of the stack of stator laminations which is to be provided later with the rods S. The frame R further comprises radius blocks 4 and 4' (FIG. 1). The radius blocks 4 and 4' are insertable into the frame R at both ends of said frame and provide bending frame wall portions which limit the curvature of the ends of the inserted rod. A shaping plate 5 having end radius blocks 5a and 5a' also functions as bending frame wall portions to limit the curvature of the inserted rod on its surfaces opposite those limited by the radius blocks 4 and 4'. The shaping plate 5 is placed on the surface of the rod after it is inserted into the frame.

Figure 2:
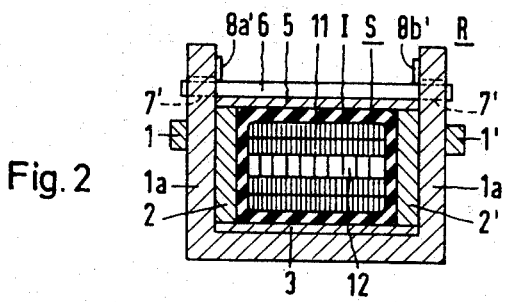
FIG. 2 is a cross-section through the saturation and hardening frame of FIG. 1, with an inserted rod, shown in cross-section through its groove area.

The frame R also comprises clamping irons 6 and 6'. The clamping irons 6 and 6' may be fitted into oppositely positioned recesses 7, 7', and the like, of the U-shaped spacers 1a, 1a', and the like, after the insertion of the rod. The clamping irons 6, 6' are fitted by the interposition of clamping angles 8a and 8b and 8a' and 8b', respectively (FIG. 1). The clamping angles 8a, 8b, 8a', 8b', and the like, are driven into the corresponding bores 7, 7', and the like, above the corresponding fitted clamping irons 6, 6', and the like, as shown in FIG. 2. A pair of U-shaped end spacers 9 and 9' may be provided at the opposite ends of the frame R and may be utilized to affix said frame to a baking cart 14 shown in FIG. 3. The frame R is affixed to the baking cart after the completion of the saturation process, as hereinafter described.

The structure of the individual rod S within its casing of insulation I (FIG. 2) is not essential to my invention. The rod S may comprise, in a conventional manner, massive component conductors 11 and cooling tubes or conduits 12, as shown in FIG. 2. The component conductors 11 and the cooling tubes 12 are mutually insulated from each other by suitable insulation. When the rod S has been provided with its continuous winding of insulation I, it is inserted, in the aforedescribed manner, into the saturation and hardening frame R. The frame R is then closed.

Thus, the groove area N (FIG. 3) of the rod S and only the curved rod areas 13 and 13' (FIG. 3) are fixed. The thus formed unit, comprising a single rod S and a single frame R, may then be inserted into a saturation frame and the rod may be subjected to a known vacuum saturation process. The adhesive of the tapes, or the like, containing mica, for the insulation I is selected so that it may be completely inserted into the resin hardening system, utilized for saturation. The adhesive and resin hardening system preferably utilizes epoxy resin compounds.

The single frame R and the single rod S may be readily and facilely inserted into and removed from the vacuum saturation installation. The frame R Rand the rod S may be removed upon the completion of saturation, before hardening sets in. Then, after the excess resin has dropped off, a plurality of saturated single rods S, with their frames R, are clamped to the baking cart 14, in accordance with the invention, and as shown in FIG. 3.

The rods S and the frames R define a hardening unit in which they are fixed in parallel with their axes. That is, the rods S and the frames R are so positioned that they are axially parallel to each other. The non-fixed winding end portions W (FIG. 3) of the rods and the ends S1 of said rods are fixed, by additional frames Rz and Rz', at each end of the hardening unit. The baking cart 14 may, of course, be replaced by a sled, or the like. The baking cart 14, as shown in FIG. 3, has an undercarriage 14a, 14a' and a bottom plate 14b.

The bottom plate 14b of the baking cart 14 is affixed at both ends to assemblies for the additional frames Rz and Rz'. The individual rods S are bolted or wedged in by means of their frames R and there end spacers 9 and 9'. The additional frames Rz and Rz' comprise basic frame portions 15 and 15', respectively. The basic frame portion 15 has a plurality of fixing blocks 15a mounted thereon and the basic frame portion 15' has a plurality of fixing blocks 15a' mounted thereon. The fixing blocks 15a and 15a' of the basic frame portions 15 and 15', respectively, accommodate the rod ends and winding end portions 16. The fixing blocks 15a and 15a' are mounted in accordance with the desired progress of the rod in the winding end portions W.

The fixing blocks 15a and 15a' may be pivotally mounted on the upper surface of the basic frame portions 15 and 15', respectively, in a manner whereby they are horizontally displaceable and in fixed mutual relation. The winding end portions 16 comprise a material which remains stable in configuration at the utilized baking temperature. A suitable material for the winding end portions 16 may comprise, for example, sheet metal, which is bent to the desired configuration.

In the illustrated embodiments of the apparatus of the invention, the winding end portions W of four rods are shown as bearing on or abutting against the curved bearing surfaces 16a of the winding end portion 16. The hardening unit, shown in FIG. 3, may be moved into the furnace and subjected to the hardening process. After the completion of the hardening process, and after the termination of the cooling period, the individual rods S may be removed from the baking cart 14. The frames R may then be disassembled, thereby releasing the then completely saturated and hardened rods S. Simultaneously, the winding end portions W and the rod ends S1 are provided with their final configuration and dimensions, so that the completely processed rods may be inserted into the stack of stator laminations.

While the invention has been described by means of a specific example and in a specific embodiment, I do not wish to be limited thereto, for obvious modifications will occur to those skilled in the art without departing from the spirit and scope of the invention.

I claim:

1. Apparatus for saturating and actual size hardening of tapes utilized to insulate rods of stator windings of electric machines, each of said rods having a straight groove portion and curved winding end portions relative to said straight groove portion, said apparatus comprising a plurality of frames each having frame wall portions defining the groove dimensions of a corresponding rigid rod wound with the insulating tape and substantially in its final configuration, and additional bending frame wall portions for fixing the curved winding end portions of said rod in the junction between said groove and said end portions and having a straight groove portion extending between said curved winding end portions for fixing the straight groove portion of the rod, a corresponding one of said rods being inserted into each of said frames thereby preparing said frames and said rods for a saturating operation; and hardening unit means comprising a carrier for a plurality of said rods and their frames combined into a hardening unit with said frames in axial parallel relation to each other and an additional frame provided for all said rods in common at each surface at each end of said hardening unit for fixing the winding end portions and rod ends thereby preparing said frames and said rods for a hardening operation.

2. Apparatus as claimed in claim 1, wherein the additional frame of said hardening unit means comprises curved bearing surfaces corresponding to the curve of the winding end portions of said rods for supporting the bottom surfaces of said rods.

3. Apparatus as claimed in claim 2, wherein said carrier comprises a wheeled vehicle including a bottom plate and structure at each end for the additional frame of said hardening unit means.

4. Apparatus as claimed in claim 2, wherein said carrier comprises a slidable platform including a bottom plate and structure at each end for the additional frame of said hardening unit means.

5. Apparatus for saturating and actual size hardening of tapes containing mica and having a small adhesive content utilized to insulate rods of stator windings of turbogenerators, each of said rods having a straight groove portion and curved winding end portions relative to said straight groove portion, rods wound with said tapes being inserted into a saturating and hardening frame and saturated in said frame and hardened in a manner which determines the outer dimensions of the completed wound insulating tape, said rods being inserted into their frame by assembling of frame portions comprising spacers and fillers in a manner whereby the groove dimensions of a stack of stator laminations for said rods provide appropriate receiving channels, said apparatus comprising a plurality of frames each having frame wall portions defining the groove dimensions of a corresponding rigid rod wound with the insulating tape and substantially in its final configuration, and additional bending frame wall portions for fixing the curved winding end portions of said rod in the junction between said groove and said end portions and having a straight groove portion extending between said curved winding end portions for fixing the straight groove portion of the rod, a corresponding one of said rods being inserted into each of said frames thereby preparing said frames and said rods for a saturating operation; and hardening unit means comprising a carrier for a plurality of said rods and their frames combined into a hardening unit with said frames being in axial parallel relation to each other and an additional frame provided for all said rods in common at each surface at each end of said hardening unit for fixing the winding end portions and rod ends thereby preparing said frames and said rods for a hardening operation.

6. Apparatus as claimed in claim 5, wherein said carrier includes a bottom plate and structure at each end for the additional frame of said hardening unit means.

7. Apparatus as claimed in claim 5, wherein the additional frame of said hardening unit means comprises curved bearing surfaces corresponding to the curve of the winding end portions of said rods for supporting the bottom surfaces of said rods.

8. Apparatus as claimed in claim 6, wherein said carrier comprises a wheeled baking cart.

9. Apparatus as claimed in claim 6, wherein said carrier comprises a sled.

* * * * *